US012600662B2

(12) United States Patent
Gwoo et al.

(10) Patent No.: US 12,600,662 B2
(45) Date of Patent: Apr. 14, 2026

(54) ANTIBACTERIAL GLASS COMPOSITION AND METHOD FOR PREPARING SAME

(71) Applicant: LG ELECTRONICS INC., Seoul (KR)

(72) Inventors: Dong Gun Gwoo, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1243 days.

(21) Appl. No.: 17/049,848

(22) PCT Filed: Apr. 19, 2019

(86) PCT No.: PCT/KR2019/004763
§ 371 (c)(1),
(2) Date: Oct. 22, 2020

(87) PCT Pub. No.: WO2019/208975
PCT Pub. Date: Oct. 31, 2019

(65) Prior Publication Data
US 2021/0047232 A1 Feb. 18, 2021

(30) Foreign Application Priority Data

Apr. 24, 2018 (KR) ........................ 10-2018-0047436

(51) Int. Cl.
*A61K 9/00* (2006.01)
*C03C 3/062* (2006.01)
(Continued)

(52) U.S. Cl.
CPC ................ *C03C 4/00* (2013.01); *C03C 3/062* (2013.01); *C03C 3/093* (2013.01); *C03C 3/21* (2013.01)

(58) Field of Classification Search
CPC ................................................... A61K 49/0004
See application file for complete search history.

(56) References Cited

U.S. PATENT DOCUMENTS 5,330,940 A 7/1994 Aitken et al.
2002/0189289 A1 12/2002 Shetterly
(Continued)

FOREIGN PATENT DOCUMENTS

EP 0192844 A2 9/1986
EP 0578023 A1 6/1993
(Continued)

OTHER PUBLICATIONS

Muthupari, XANES of sixfold silicon in MoO3âSiO2âP2O5 glasses, Journal of Non-Crystalline Solids, vol. 238, Issue 3, Sep. 11, 1998, pp. 259-265 (Year: 1998).*

*Primary Examiner* — Paul W Dickinson
(74) *Attorney, Agent, or Firm* — Bryan Cave Leighton Paisner LLP

(57) ABSTRACT

The present invention relates to: an antibacterial glass composition which has antibacterial properties not only in an acidic environment but also in a non-acidic environment, by controlling water resistance; and a method for preparing same. The antibacterial glass composition according to the present invention includes: at least one of $P_2O_5$, $SiO_2$, and $B_2O_3$; and $MoO_3$, wherein 30 to 80 wt % of the at least one of $P_2O_5$, $SiO_2$, and $B_2O_3$ is included to control water resistance, thereby providing the antibacterial glass composition which has antibacterial properties not only in an acidic environment but also in a non-acidic environment, and a method for preparing same.

8 Claims, 1 Drawing Sheet

(51) Int. Cl.
<br>　　　*C03C 3/093*　　　(2006.01)
<br>　　　*C03C 3/21*　　　(2006.01)
<br>　　　*C03C 4/00*　　　(2006.01)

(56)　　　　　　References Cited

U.S. PATENT DOCUMENTS

| | | | |
|---|---|---|---|
| 2003/0064874 | A1 | 4/2003 | Eckmann et al. |
| 2005/0096208 | A1 | 5/2005 | Zachau et al. |
| 2005/0233888 | A1* | 10/2005 | Seneschal ................ A61K 8/24 |
| | | | 501/48 |
| 2006/0025298 | A1 | 2/2006 | Emlemdi |
| 2007/0122356 | A1 | 5/2007 | Kessle et al. |
| 2008/0153068 | A1 | 6/2008 | Kessler et al. |
| 2010/0004111 | A1 | 1/2010 | Kobayashi et al. |
| 2015/0013390 | A1 | 1/2015 | Singh et al. |
| 2020/0148583 | A1 | 5/2020 | Choi et al. |

FOREIGN PATENT DOCUMENTS

| | | | |
|---|---|---|---|
| EP | 1256556 | A1 | 11/2002 |
| EP | 2817268 | A1 | 12/2014 |
| EP | 3650414 | A1 | 5/2020 |
| GB | 761288 | A | 11/1956 |
| JP | 2000007375 | A | 1/2000 |
| JP | 2005-255517 | A | 9/2005 |
| JP | 2005314292 | A | 11/2005 |
| KR | 10-0940007 | B1 | 2/2004 |
| KR | 10-2005-0031975 | A | 4/2005 |
| KR | 10-2007-0015393 | A | 2/2007 |
| WO | 2007108245 | A1 | 8/2009 |

\* cited by examiner

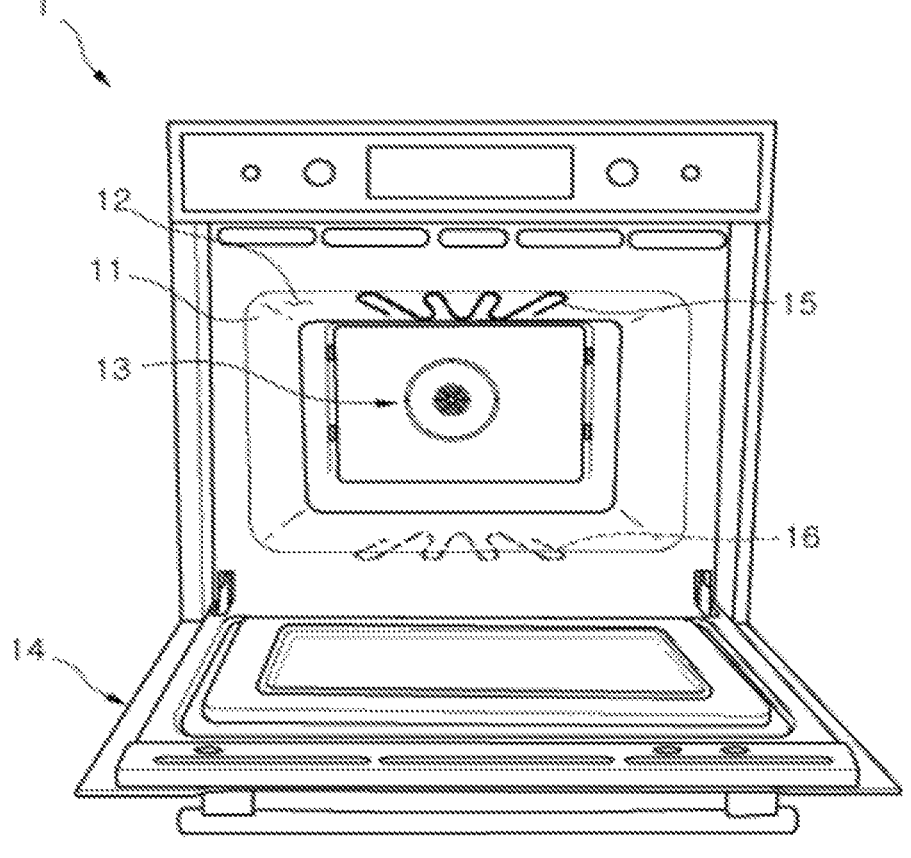

ANTIBACTERIAL GLASS COMPOSITION AND METHOD FOR PREPARING SAME

CROSS-REFERENCE TO RELATED APPLICATIONS

This application is the National Phase of PCT International Application No. PCT/KR2019/004763, filed on Apr. 19, 2019, which claims priority to Korean Patent Application No. 10-2018-0047436 filed on Apr. 24, 2018 in Korea, the entire contents of which is hereby incorporated by reference in its entirety.

TECHNICAL FIELD

The present disclosure relates to an antibacterial glass composition having antibacterial properties not only in an acidic environment but also in a non-acidic environment by controlling water resistance and a method for preparing the same.

BACKGROUND ART

Microorganisms such as viruses, fungi, and bacteria are present in our living spaces such as basins, refrigerator shelves, or washing machines. The microorganisms may get into our body, which causes life-threatening infections. Therefore, household products such as the basins, the refrigerator shelves, ovens or the washing machines require an antibacterial glass composition capable of controlling diffusion of microorganisms.

In related art, a method of increasing a number of hydrogen cations generated in moisture and molybdenum oxide by including molybdenum oxide in the antibacterial glass composition has been used. In this case, the aqueous medium creates an acidic environment and the microorganisms are killed by the acidic environment. However, when a single molybdenum oxide is used in the antibacterial glass composition as described above, there is a problem in that water resistance of the antibacterial glass composition is degraded and the acidic environment may be created.

A method of using complex oxide in which molybdenum and silver or molybdenum and copper are combined in the antibacterial glass composition is used to have excellent water resistance. However, there is a problem in that, as the complex oxide is included in the antibacterial glass composition, a proportion of molybdenum is reduced, and thus, the aqueous medium may have difficulty in creating the acidic environment, thereby degrading antibacterial properties.

In addition, there is a problem in that, as the complex oxide in which molybdenum and silver or molybdenum and copper are combined is included in the antibacterial glass composition, coagulability and cytotoxicity occur in the human body.

DISCLOSURE

Technical Problem

The present disclosure provides an antibacterial glass composition having excellent water resistance even in an acidic environment and antibacterial properties.

In particular, the present disclosure provides an antibacterial glass composition having antibacterial properties even if an acidic environment is not created.

The present disclosure further provides a stable antibacterial glass composition that does not cause coagulability and cytotoxicity in and is harmless to the human body.

Technical Solution

In order to provide an antibacterial glass composition having excellent water resistance even in an acidic environment as well as antibacterial properties, the antibacterial glass composition according to the present disclosure includes at least one of $P_2O_5$, $SiO_2$, or $B_2O_3$; and $MoO_3$; and includes 30 to 80% by weight of the at least one of $P_2O_5$, $SiO_2$, or $B_2O_3$.

In addition, in order to provide an antibacterial glass composition having antibacterial properties even if an acidic environment is not created, the antibacterial glass composition according to the present disclosure includes at least one of $P_2O_5$, $SiO_2$, or $B_2O_3$; and $MoO_3$; and 30 to 80% by weight of the at least one of $P_2O_5$, $SiO_2$, or $B_2O_3$, and may further include 1 to 30% by weight of at least one of ZnO or CuO.

In addition, in order to provide a stable antibacterial glass composition that does not cause coagulability and cytotoxicity in the human body and is harmless to the human body, the antibacterial glass composition does not include complex oxide, but may include 30 to 40% by weight of $P_2O_5$; 20 to 30% by weight of $SiO_2$; and 30 to 40% by weight of $MoO_3$.

Advantageous Effects

An antibacterial glass composition according to the present disclosure has a new component system in which the antibacterial glass composition includes at least one of $P_2O_5$, $SiO_2$, or $B_2O_3$; and $MoO_3$; includes 30 to 80% by weight of the at least one of $P_2O_5$, $SiO_2$, or $B_2O_3$. Therefore, there is an effect that the antibacterial glass composition has excellent water resistance even in an acidic environment and antibacterial properties.

In addition, the antibacterial glass composition according to the present disclosure includes at least one of $P_2O_5$, $SiO_2$, or $B_2O_3$; and $MoO_3$; 30 to 80% by weight of the at least one of $P_2O_5$, $SiO_2$, or $B_2O_3$, and further include 1 to 30% by weight of at least one of ZnO or CuO. Therefore, there is an effect that the antibacterial glass composition has antibacterial properties without reaction with a water-soluble medium.

Furthermore, for the antibacterial glass composition according to the present disclosure, an enamel composition does not include complex oxide, but include 30 to 40% by weight of $P_2O_5$; 20 to 30% by weight of $SiO_2$; and 30 to 40% by weight of $MoO_3$. Therefore, there is an effect in that the antibacterial glass composition does not cause coagulability and cytotoxicity in and is harmless to the human body.

DESCRIPTION OF DRAWINGS

FIG. 1 is a front view showing a cooking appliance according to an embodiment of the present disclosure.

BEST MODE

The above-mentioned objects, features, and advantages are described below in detail, and accordingly, the skilled in the art to which the present disclosure pertains will easily embody the technical idea of the present disclosure. In describing the present disclosure, a detailed description of a well-known technology relating to the present disclosure may be omitted if it unnecessarily obscures the gist of the present disclosure. Hereinafter, preferred embodiments according to the present disclosure are described in detail.

Example embodiments may, however, be embodied in different manners and should not be construed as limited to example embodiments set forth herein. Rather, these example embodiments are provided so that this disclosure will be thorough and complete, and will fully convey the scope of example embodiments to those skilled in the art. Hereinafter, an antibacterial glass composition according to the present disclosure and a method for preparing the same are described in detail.

<Antibacterial Glass Composition>

An antibacterial glass composition according to the present disclosure includes at least one of $P_2O_5$, $SiO_2$, or $B_2O_3$; and $MoO_3$; and includes 30 to 80% by weight of the at least one of $P_2O_5$, $SiO_2$, or $B_2O_3$.

$P_2O_5$ may form an alkali phosphate glass structure and functions as a glass former to facilitate addition of a large amount of $MoO_3$ into the antibacterial glass composition. In addition, $P_2O_5$ functions to improve glass formation performance and react with an aqueous medium and reduce pH, thereby creating an acidic environment.

$SiO_2$ is a component forming a glass structure and strengthens a skeleton of the glass structure to improve the water resistance of the antibacterial glass composition. In addition, $SiO_2$ has an effect embodying antibacterial properties even without a water-soluble medium.

$B_2O_3$ functions as a glass-forming agent and has an effect of preventing crystallization of a glass composition by maintaining appropriate viscosity when melting the antibacterial glass composition. In addition, $B_2O_3$ functions to uniformly melt each of components of the antibacterial glass composition. In addition, $B_2O_3$ functions to improve coating performance by adjusting coefficient of thermal expansion and fusion flow of the antibacterial glass composition. In addition, there is an effect in that $B_2O_3$ improves the water resistance of the antibacterial glass composition and has antibacterial properties even without a water-soluble medium.

$MoO_3$ has antibacterial properties. In particular, $MoO_3$ reacts with water as an aqueous medium to form W. As a number of $H^+$ increases, a pH value becomes less than 6, thereby creating an acidic environment. The acidic environment has an antibacterial effect against microorganisms.

The antibacterial glass composition includes at least one of $P_2O_5$, $SiO_2$, or $B_2O_3$ in a range of 30 to 80% by weight. If the at least one of $P_2O_5$, $SiO_2$, or $B_2O_3$ exceeds 80% by weight, there may be a problem in that the antibacterial properties of the antibacterial glass composition are degraded. If the at least one of $P_2O_5$, $SiO_2$, or $B_2O_3$ is less than 30% by weight, there may be a problem in that the water resistance of the antibacterial glass composition is deteriorated and the stability of the glass structure may be degraded.

The antibacterial glass composition according to the present disclosure may include $P_2O_5$ in a range of 30 to 50% by weight and $MoO_3$ in a range of 3 to 40% by weight.

Preferably, the antibacterial glass composition according to the present disclosure may include $P_2O_5$ in a range of 30 to 50% by weight and $MoO_3$ in a range of 20 to 40% by weight.

More preferably, the antibacterial glass composition according to the present disclosure may include $P_2O_5$ in a range of 30 to 40% by weight, $SiO_2$ in a range of 20 to 30% by weight, and $MoO_3$ in a range of 30 to 40% by weight.

If the content of $P_2O_5$ exceeds 50% by weight in the antibacterial glass composition, vitrification of the antibacterial glass composition may be difficult and thermal properties of the sintered antibacterial glass composition may be degraded. If the $P_2O_5$ content is less than 30% by weight in the antibacterial glass composition, an amount of $MoO_3$ added is reduced, thereby degrading antibacterial properties.

In addition, if the content of $MoO_3$ exceeds 40% by weight in the antibacterial glass composition, there may be a problem in that excellent water resistance may not be achieved and the thermal properties of the sintered antibacterial glass composition are degraded. If the content of $MoO_3$ is less than 3% by weight in the antibacterial glass composition, there may be a problem in that antibacterial properties thereof may be degraded.

In addition, for the $P_2O_5$ content and the $MoO_3$ content, the antibacterial glass composition preferably includes $P_2O_5$ in a range of 30 to 50% by weight and $MoO_3$ in a range of 20 to 40% by weight to prevent degradation of thermal properties of the antibacterial glass composition, have excellent water resistance, and achieve antibacterial performance.

In addition, for the $P_2O_5$ content, the $MoO_3$ content, and the $SiO_2$ content, the antibacterial glass composition preferably includes $P_2O_5$ in a range of 30 to 40% by weight, $SiO_2$ in a range of 20 to 30% by weight, and $MoO_3$ in a range of 30 to 40% by weight to provide the antibacterial glass composition having excellent water resistance and achieving antibacterial performance and stable and harmless to the human body without occurring coagulability and cytotoxity in the human body.

The antibacterial glass composition according to the present disclosure may further include at least one of ZnO or CuO. Preferably, the antibacterial glass composition according to the present disclosure may include the at least one of ZnO or CuO in a range of 1 to 30% by weight. More preferably, the antibacterial glass composition according to the present disclosure may include the at least one of ZnO or CuO in a range of 1 to 25% by weight.

ZnO and CuO perform antibacterial function in the antibacterial glass composition. In particular, the antibacterial glass composition according to the present disclosure further includes at least one of ZnO or CuO, thereby embodying antibacterial properties even if an acidic environment is not created. In addition, the antibacterial glass composition according to the present disclosure further includes the at least one of ZnO or CuO to control a rate at which it is dissolved with the water-soluble medium and control the antibacterial properties according to usage.

If the at least one of ZnO or CuO exceeds 30% by weight in the antibacterial glass composition, there may be a problem in that the thermal properties of the sintered antibacterial glass composition are degraded. If the at least one of ZnO or CuO is less than 1% by weight in the antibacterial glass composition, it may be difficult to control the antibacterial properties according to the usage.

The antibacterial glass composition according to the present disclosure may further include 1 to 40% by weight of at least one of $Li_2O$, $Na_2O$, or $K_2O$. Preferably, the antibacterial glass composition according to the present disclosure may include at least one of $Li_2O$, $Na_2O$, or $K_2O$ in a range of 10 to 35% by weight.

Group I oxides, such as $Li_2O$, $Na_2O$, and $K_2O$, have an effect of improving antibacterial properties of the antibacterial glass composition by controlling a number of valence electros in an ion of each of $MoO_3$, ZnO, and CuO. If at least one of $Li_2O$, $Na_2O$, or $K_2O$ exceeds 40% by weight in the antibacterial glass composition, there may be a problem in that the thermal properties of the sintered antibacterial glass composition are degraded. If the at least one of $Li_2O$, $Na_2O$, or $K_2O$ is less than 1% by weight in the antibacterial glass composition, it is difficult to control the number of valence electrons in an ion of each of $MoO_3$, $ZnO$, and $CuO$, thereby degrading the antibacterial properties of the antibacterial glass composition.

The antibacterial glass composition according to the present disclosure may further include 1 to 10% by weight of $Al_2O_3$. Preferably, the antibacterial glass composition according to the present disclosure may include $Al_2O_3$ in a range of 1 to 5% by weight.

$Al_2O_3$ has an effect of supplementing weak durability of the alkali phosphate glass structure of the antibacterial glass composition and improving the hardness of the sintered antibacterial glass composition. If the amount of $Al_2O_3$ exceeds 10% by weight in the antibacterial glass composition, the content of each of $MoO_3$, $ZnO$, and $CuO$ is reduced, thereby causing a problem in that the antibacterial properties of the antibacterial glass composition are degraded. In addition, adhesion of the antibacterial glass composition may be degraded due to a high melting temperature and fusion flow. If $Al_2O_3$ is less than 1% by weight in the antibacterial glass composition, there may be a problem in that the durability of the sintered antibacterial glass composition may be degraded.

<Method for Preparing Antibacterial Glass Composition>

A method for preparing an antibacterial glass composition according to the present disclosure includes providing materials for antibacterial glass composition including 30 to 80% by weight of at least one of $P_2O_5$, $SiO_2$, or $B_2O_3$; melting the materials for the antibacterial glass composition; and cooling the melted materials for the antibacterial glass composition using a quenching roller to form an antibacterial glass composition.

Preferably, the materials for the antibacterial glass composition may include 30 to 40% by weight of $P_2O_5$; 20 to 30% by weight of $SiO_2$; and 30 to 40% by weight of $MoO_3$.

In addition, the materials for the antibacterial glass composition may further include 1 to 40% by weight of at least one of $Li_2O$, $Na_2O$, or $K_2O$.

$NH_4H_2PO_4$ may be used as a raw material of $P_2O_5$, and $Na_2CO_3$, $K_2CO_3$, and $Li_2CO_3$ may be used as raw materials of $Na_2O$, $K_2O$, and $Li_2O$, respectively, but the present disclosure is not limited thereto.

After sufficiently mixing the materials for the antibacterial glass composition, the materials for the antibacterial glass composition are melted. Preferably, the materials for the antibacterial glass composition may be melted in a temperature range of 1000 to 1500° C. In addition, the materials for the antibacterial glass composition may be melted for 10 to 60 minutes.

Thereafter, the melted materials for the antibacterial glass composition may be quenched by a chiller using a quenching roller to form the antibacterial glass composition.

<Preparation of Enamel>

An antibacterial glass composition according to the present disclosure may be coated on a surface of a target object. The target objects correspond to various home appliances to be coated with the antibacterial glass composition and the antibacterial glass composition may be coated on a surface of each of microwave ovens and refrigerators and door glass of an oven which is a cooking appliance. In addition, the target object may be a portion or all of a metal plate, a glass plate, and a cooking appliance. Preferably, the antibacterial glass composition may be coated on an inner surface of cavity of the cooking appliance or an inner surface of the door of the cooking appliance.

Referring to FIG. 1, a cooking appliance 1 includes a cavity 11 defining a cooking space 12, a door 14 to selectively open and close the cooking space 12, and at least one heating source 13, 15, and 16 to supply heat for heating food in the cooking space 12. The cavity 11 may have a hexahedral shape with an open front surface. The heating sources 13, 15, and 16 include a convection assembly 13 to discharge heated air into the cavity 11, an upper heater 15 disposed at an upper portion of the cavity 11, and a lower heater 16 disposed at a lower portion of the cavity 11. The upper heater 15 and the lower heater 16 may each be disposed inside or outside of the cavity 11. The heating sources 13, 15, and 16 do not necessarily include the convection assembly 13, the upper heater 15, and the lower heater 16. For example, the heating sources 13, 15, and 16 may include at least one of the convection assembly 13, the upper heater 15, or the lower heater 16.

The antibacterial glass composition according to the present disclosure may be coated on the inner surface of the cavity 11 or the inner surface of the door 14 of the cooking appliance 1 by a dry process or a wet process.

In the dry process, the materials for the antibacterial glass composition are dispersed in an organic binder, and the mixed materials for the antibacterial glass composition and the organic binder are milled in a ball mill to prepare a glass frit. In the wet process, the materials for the antibacterial glass composition are dispersed in water ($H_2O$) and a pigment, and the mixed materials for the antibacterial glass composition, water ($H_2O$), and the pigment are milled in the ball mill to prepare a glass frit.

Thereafter, the glass frit prepared according to the dry process and the wet process may be applied onto the inner surface of the cavity 11 or the inner surface of the door 14 of the cooking appliance 1 using a spray method. The applied glass frit is fired for 300 to 450 seconds in a temperature range of 830 to 870° C. and coated on the inner surface of the cavity 11 or the inner surface of the door 14 of the cooking appliance 1.

Hereinafter, specific aspects of the present disclosure are described in embodiments.

Embodiment

<Preparation of Antibacterial Glass Composition>

An antibacterial glass composition having a composition ratio shown in Table 1 below was prepared. Raw materials of components were sufficiently mixed for 3 hours in a V-mixer. $NH_4H_2PO_4$ was used as raw material of $P_2O_5$ and $Na_2CO_3$, $K_2CO_3$, and $Li_2CO_3$ were respectively used as raw materials of $Na_2O$, $K_2O$, and $Li_2O$, and for the remaining components, the same components were used as those shown in Table 1. The mixed materials were sufficiently melted at 1300° C. for 1 hour and 30 minutes, and then quenched using a quenching roller to obtain a glass cullet.

After controlling an initial particle size of the glass cullet obtained by the above process using a ball mill, the glass cullet was pulverized for about 5 hours using a jet mill, passed through a 325 mesh sieve (ASTM C285-88), and controlled a particle size to be 45 µm or less to prepare a frit (a powder). The frit was sprayed onto a low-carbon steel sheet having an area of 200×200 (mm) and a thickness of 1 (mm) or less using a Corona discharge gun. The voltage of the discharge gun was controlled to be 40 kV to 100 kV and an amount of frit sprayed on the low-carbon steel sheet was 300 g/m². The low-carbon steel sprayed with the frit was fired for 300 to 450 seconds in a temperature range of 830° C. to 870° C. to form a coating layer on a surface of the low-carbon steel. In this case, the coating layer was formed at a thickness of about 80 µm to 250 µm.

TABLE 1

| Component | Embodiment | | | | | | | Comparative example | | |
|---|---|---|---|---|---|---|---|---|---|---|
| (% by weight) | 1 | 2 | 3 | 4 | 5 | 6 | 7 | 1 | 2 | 3 |
| P2O5 | 46 | 43 | 41 | 38 | 39 | 0 | 39 | 0 | 0 | 16 |
| SiO2 | 0 | 0 | 0 | 16 | 0 | 44 | 26 | 36 | 44 | 34 |
| B2O3 | 0 | 0 | 0 | 0 | 15 | 26 | 0 | 20 | 36 | 0 |
| Li2O | 0 | 0 | 0 | 12 | 0 | 0 | 0 | 2 | 0 | 0 |
| Na2O | 0 | 0 | 0 | 0 | 12 | 0 | 0 | 16 | 0 | 0 |
| K2O | 31 | 29 | 0 | 0 | 0 | 12 | 0 | 6 | 13 | 0 |
| CuO | 0 | 6 | 0 | 0 | 10 | 10 | 0 | 0 | 0 | 0 |
| ZnO | 0 | 0 | 23 | 10 | 0 | 2 | 0 | 20 | 2 | 5 |
| MoO3 | 23 | 22 | 36 | 21 | 22 | 3 | 35 | 0 | 2 | 0 |
| Al2O3 | 0 | 0 | 0 | 3 | 2 | 3 | 0 | 0 | 3 | 45 |

<Preparation of Antibacterial Glass Composition Sample>

An antibacterial glass compositions according to Embodiments 1 to 7 and Comparative Examples 1 to 3 were sprayed onto a total of 10 low-carbon steel sheets having an area of 200 mm×200 mm and a thickness of 1 mm or less using a Corona discharge gun. The voltage of the corona discharge gun was controlled in a range of 40 to 100 kV. An amount of antibacterial glass composition sprayed onto the low-carbon steel sheet is 300 g/m². Thereafter, the low-carbon steel sprayed with the antibacterial glass composition was fired for 300 to 450 seconds in a temperature range of 830 to 870° C. to finally prepare a total of 10 antibacterial glass composition samples.

EXPERIMENTAL EXAMPLE

The antibacterial glass composition samples prepared in embodiments and comparative examples were measured as follows and the results thereof are shown in Table 2.
1. Used type strain—*Escherichia coli* American type culture collection (ATCC) 8739
2. Standard coated film—Stomacher 400 POLY-BAG
3. Test conditions—Measure a number of viable bacterias after 24 hours of culturing at 35±1° C. and RH 90±5%.
   $M_a$: An average value of a number of viable bacterias collected immediately after inoculation of used type strain into a standard sample (3 samples)

$M_b$: An average value of a number of viable bacterias collected after inoculating used type strain to a standard sample and culturing for 24 hours (3 samples)

$M_c$: An average value of a number of viable bacterias collected after inoculating used type strain into an antibacterial glass composition sample and culturing for 24 hours (3 samples)

Antibacterial activity value (S): Log $(M_b/M_c)$

Reduction rate (%): $[(M_b−M_c)/M_b]×100$

Proliferation value (F): Log$(M_b/M_a)$ (equal to or greater than 1.5)

4. Evaluation of antibacterial properties

In order to measure antibacterial properties of glass, a composition was fired after spraying the composition onto a low-carbon steel sheet having a flat top surface of 60 mm×60 mm and a thickness equal to or less than 1 mm. Thereafter, the antibacterial activity value (S) was measured according to JIS Z 2801 test method, which is a film adhesion method. If the antibacterial activity value (S) is equal to or greater than 6, it is evaluated as exhibiting excellent antibacterial properties.

TABLE 2

| | Embodiment | | | | | | | Comparative example | | |
|---|---|---|---|---|---|---|---|---|---|---|
| | 1 | 2 | 3 | 4 | 5 | 6 | 7 | 1 | 2 | 3 |
| Inoculated virus concentration (CFU/ml) | $2.2 \times 10^5$ | $2.2 \times 10^5$ | $2.2 \times 10^5$ | $2.4 \times 10^5$ | $2.4 \times 10^5$ | $2.3 \times 10^5$ | $2.4 \times 10^5$ | $2.3 \times 10^5$ | $2.1 \times 10^5$ | $2.3 \times 10^5$ |
| Proliferation value (F) | 1.7 | 1.7 | 1.7 | 1.7 | 1.7 | 1.7 | 1.7 | 1.7 | 1.7 | 1.7 |
| $M_a$ | $2.2 \times 10^5$ | $2.2 \times 10^5$ | $2.2 \times 10^5$ | $2.4 \times 10^5$ | $2.4 \times 10^5$ | $2.3 \times 10^5$ | $2.4 \times 10^5$ | $2.3 \times 10^5$ | $2.1 \times 10^5$ | $2.3 \times 10^5$ |
| $M_b$ | $1.1 \times 10^7$ | $1.1 \times 10^7$ | $1.1 \times 10^7$ | $1.3 \times 10^7$ | $1.3 \times 10^7$ | $1.2 \times 10^7$ | $1.3 \times 10^7$ | $1.2 \times 10^7$ | $1.0 \times 10^7$ | $1.2 \times 10^7$ |
| $M_c$ | <10 | <10 | <10 | <10 | <10 | <10 | <10 | $2.4 \times 10^4$ | $2.8 \times 10^5$ | $7.9 \times 10^5$ |
| Reduction rate (%) | 99.9 | 99.9 | 99.9 | 99.9 | 99.9 | 99.9 | 99.9 | 99.8 | 97.2 | 33.8 |
| Antibacterial activation value (S) | 6.0 | 6.0 | 6.0 | 6.1 | 6.1 | 6.1 | 6.1 | 2.7 | 1.5 | 0.2 |

As shown in Table 2, it was found that the antibacterial glass composition in Embodiments of the present disclosure did not include complex oxides, but controlled water resistance to achieve excellent antibacterial performance in an acidic environment and a non-acidic environment.

The antibacterial glass compositions in the comparative examples have a low antibacterial activity vlalue (S) in comparison to the antibacterial glass compositions in embodiments and showed unsatisfactory antibacterial performance.

Although the present disclosure has been described as described above, the present disclosure is not limited to the embodiments disclosed herein, and various modifications can be made by those skilled in the art within the scope of the technical idea of the present disclosure. Further, even if working effects obtained based on configurations of the present disclosure are not explicitly described in the description of embodiments of the present disclosure, effects predictable based on the corresponding configuration have to be recognized.

DESCRIPTION OF SYMBOLS

1: Cooking appliance
11: Cavity
12: Cooking space
13: Convection assembly

14: Door
15: Upper heater
16: Lower heater

The invention claimed is:

1. An antibacterial glass composition, comprising:
30 to 40% by weight of the $P_2O_5$;
20 to 30% by weight of the $SiO_2$; and
30 to 40% by weight of the $MoO_3$,
   wherein the antibacterial glass composition further comprising at least one of ZnO or CuO,
   wherein the antibacterial glass composition includes 10% or more by weight of at least one of $Li_2O$, $Na_2O$, or $K_2O$.

2. The antibacterial glass composition of claim 1, comprising 1 to 30% by weight of the at least one of ZnO or CuO.

3. The antibacterial glass composition of claim 1, further comprising 1 to 10% by weight of $Al_2O_3$.

4. A home appliance comprising a surface coated with the antibacterial glass composition of claim 1.

5. The home appliance of claim 4, wherein the home appliance comprises a microwave oven, a refrigerator, and a cooking appliance.

6. The home appliance of claim 4, wherein the surface coated with the antibacterial glass composition comprises a portion or all of a metal plate or a glass plate of the home appliance.

7. The home appliance of claim 4, wherein the home appliance is a cooking appliance, and the surface coated with the antibacterial glass composition comprises an inner surface of a cavity.

8. The home appliance of claim 4, wherein the home appliance is a cooking appliance, and the surface coated with the antibacterial glass composition comprises an inner surface of a door.

* * * * *